US006813389B1

(12) United States Patent
Gindele et al.

(10) Patent No.: US 6,813,389 B1
(45) Date of Patent: Nov. 2, 2004

(54) DIGITAL IMAGE PROCESSING METHOD AND SYSTEM INCLUDING NOISE REDUCTION AND TONE SCALE ADJUSTMENTS

(75) Inventors: Edward B. Gindele, Rochester, NY (US); Alex Lopez-Estrada, Macedon, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/461,931

(22) Filed: Dec. 15, 1999

(51) Int. Cl.[7] .................................................. G06T 5/00
(52) U.S. Cl. ........................ 382/274; 382/167; 358/518
(58) Field of Search ................................ 382/167, 274, 382/275, 264; 348/96, 97; 358/3.26, 3.27, 519, 518, 527

(56) References Cited

U.S. PATENT DOCUMENTS

| | | | | |
|---|---|---|---|---|
| 5,051,341 | A | | 9/1991 | Muenter et al. ............. 430/359 |
| 5,134,573 | A | | 7/1992 | Goodwin .................... 364/525 |
| 5,633,511 | A | | 5/1997 | Lee et al. .................... 250/587 |
| 5,641,596 | A | * | 6/1997 | Gray et al. .................... 430/21 |
| 5,642,204 | A | | 6/1997 | Wang ........................ 358/455 |
| 5,694,484 | A | | 12/1997 | Cottrell et al. ............... 382/167 |
| 5,724,456 | A | | 3/1998 | Boyack et al. .............. 382/274 |
| 6,351,555 | B1 | | 2/2002 | Acharya et al. ............. 382/162 |
| 6,600,833 | B1 | * | 7/2003 | Tan et al. .................... 382/167 |

OTHER PUBLICATIONS

The Focal Dictionary of Photographic Technologies, Focal Press/Amphoto/Prentice–Hall Inc.First Edition 1973, Library of Congress Catalog Card No. 72–97893, Pages; Contents, p. 633, 289.
McGraw–Hill Dictionary of Scientific and Technical Terms Third Edition, McGraw–Hill Book Company, p. 1656.
The Focal Encyclopedia of Photography Third Edition, Focal Press, p. 791.
Webster's Third New International Dictionary of the English Language Unabridged, Merriam–Webster Inc., Publishers, Springfield, Mass. U.S.A.
Webster's Ninth New Collegiate Dictionary, A Merriam–Webster Inc., Publishers, Springfield, Mass. U.S.A., pp. 1241 & 1242.
J. Lee, "Digital Image Smoothing and the Sigma Filter," Computer Vision, Graphics, and Image Processing 24, 1983, pp. 255–269.

* cited by examiner

Primary Examiner—Brian Werner
(74) Attorney, Agent, or Firm—Thomas H. Close (57) ABSTRACT

A method of processing a digital image, include the steps of: specifying a noise control parameter; employing the noise control parameter to process the digital image to reduce the noise in the digital image; and employing the noise control parameter to process the digital image to adjust the tone scale of the digital image.

32 Claims, 8 Drawing Sheets

DIGITAL IMAGE PROCESSING METHOD AND SYSTEM INCLUDING NOISE REDUCTION AND TONE SCALE ADJUSTMENTS

FIELD OF THE INVENTION

The invention relates generally to the field of image processing and more particularly to image processing systems which employ both a noise reduction processing step and the application of a tone scale function processing step.

BACKGROUND OF THE INVENTION

A typical digital imaging system involves three main components: a mechanism for generating the source digital imagery, a mechanism for processing the digital image data, and a mechanism for visualizing the imagery. As such, many digital imaging systems employ more than one image processing method, or algorithm, designed to enhance the visual quality of the final rendered output. In particular, two image processing methods of interest are methods that reduce the amount of noise present and methods for adjusting the tone scale of the processed images. In general, when these two types of image processing methods are employed in the same digital imaging system, each method is optimized separately. For some digital imaging systems, the application of a noise reduction method can affect the optimization of the tone scale adjustment method.

An example of noise reduction filter used in digital imaging systems is the Sigma filter, described by Jong-Sen Lee in the journal article Digital Image Smoothing and the Sigma filter, Computer Vision, Graphics, and Image Processing Vol 24, p. 255–269, 1983. This is a noise reduction filter that uses a non-linear pixel averaging technique sampled from a rectangular window about the center pixel. Pixels in the local neighborhood are either included or excluded from the numerical average on the basis of the difference between the pixel and the center pixel. Mathematically, the Sigma filter can be represented as $$q_{mn} = \Sigma_{ij} a_{ij} p_{ij} / \Sigma_{ij} a_{ij}$$

and $$a_{ij} = 1 \text{ if } |p_{ij} - p_{mn}| <= \epsilon$$

$$a_{ij} = 0 \text{ if } |p_{ij} - p_{mn}| > \epsilon$$

where $P_{ij}$ represents the pixels in the local surround about the center pixel $p_{mn}$, $q_{mn}$ represents the noise cleaned pixel, and $\epsilon$ represents a numerical constant usually set to two times the expected noise standard deviation. The local pixels are sampled from a rectangular region centered about the pixel of interest.

The Sigma filter was designed for digital image processing applications for which the dominant noise source is Gaussian additive noise. Signal dependent noise sources can easily be incorporated by making the $\epsilon$ parameter a function of the signal strength. However, for both signal independent and signal dependent noise cases the expected noise standard deviation must be known to obtain optimal results. Varying the $\epsilon$ parameter and the window size of the filter changes the strength of the Sigma filter. The amount of noise present in the processed image varies depending on the amount of noise in the starting image, the settings of the control parameters, and the structure of the image content. In low spatial activity regions, big changes to the noise levels are experienced while in highly structured regions very little change to the noise characteristics are experienced. The Sigma filter as a noise reduction filter can be used with a tone scale adjustment algorithm in the same system. However, the description given by Jong-Sen Lee makes no mention of using the Sigma filter in conjunction with other image processing algorithms in a digital imaging system.

In U.S. Pat. No. 5,134,573, Goodwin teaches a method for adjusting the tone scale for digitally scanned photographic film systems. It is claimed that this method improves the overall image contrast through the application of a tone scale function designed to linearize the photographic response of conventional photographic film products. Goodwin discloses a mathematical formula for constructing a tone scale function which relies on several control parameters. The mathematical formula was designed to accommodate a generalized photographic film product. The control parameters must be set according to the film response characteristics for a given photographic film product to achieve optimal results. One of the control parameters discussed is sensitive to the level of noise present in the digital image. No method for calculating the noise sensitive control parameter is mentioned. Only a range of values for the noise sensitive control parameter is offered based on the photographic film type. In addition, no mention of possible interactions with other image processing methods employed in a digital imaging system is mentioned either. If a noise reduction method is employed in a digital imaging system with this tone scale adjustment method, the optimal values of the noise sensitive control parameter will change.

U.S. Pat. No. 5,633,511 to Lee et. al. describes a method of tone scale adjustment involving constructing a tone scale function for a scanned radiographic digital imaging system. The method described involves a step which estimates the magnitude of noise present in the starting digital image as a function of pixel code value. Two distinct methods for estimating the image noise are discussed: 1) an off-line method of photographing a gray scale of uniform patches at different exposures, and 2) an on-line method of sampling uniformly exposed areas of the starting image. The first noise estimation method characterizes the noise properties of the photographic film product and scanner combination. The second method estimates the noise directly from the image pixel data of the starting image. No mention of possible interactions with other image processing methods employed in a digital imaging system is mentioned. If a noise reduction method is employed in a digital imaging system with this tone scale adjustment method, the noise characteristics of the starting digital image will be altered. The in-line method of estimating the noise characteristic will still work, however, this method is more computationally intense due to the spatial filtering required.

Most digital imaging systems do not coordinate the optimization of multiple image processing methods. One approach for optimizing multiple image processing operations is described in U.S. Pat. No. 5,694,484, issued Dec. 2, 1997, to Cottrell et al. Cottrell et al. propose an image processing system that automatically optimizes the perceptual quality of images undergoing a series of selected image-processing operations. The system consists of a set of image-processing operations, an architecture, and an intelligent control. These elements take into consideration profiles of source characteristics from which the images are generated, profiles of output device characteristics, and the impact that image processing operations (individually or in concert) will have on perceived image quality. Control parameters for the individual image processing operations are modified by optimizing an image quality metric (a single numerical quality) based on mathematical formulas relating objective metrics (such as sharpness, grain, tone, and color) with perceived image quality.

In the method described by Cottrell et al, there is no direct relationship between the individual control parameters for a noise reduction processing operation and a tone scale processing operation. The values for the individual control parameters are varied over useful ranges until the image quality metric achieves an optimal value. This method involves significant computation resources to evaluate the multitude of parameter permutations.

In practical digital imaging systems the computational resources available are limited. Consequently, for a digital imaging system which employs a noise reduction filter as one of the image processing operations, it can be advantageous to varying the amount of noise reduction to conserve computational resources. Varying the amount of noise reduction can change the optimal control parameter settings for tone scale adjustment algorithms if both are employed in the same digital imaging system. If a direct and simple relationship can be determined between a noise reduction filter control parameter and a tone scale adjustment control parameter, computationally complex methods, such as described by Cottrell et al. and Lee et. al. could be improved upon. Consequently, there exists a need for a computationally simple method of simultaneously controlling both a noise reduction filter and a tone scale adjustment algorithm with a single control parameter.

SUMMARY OF THE INVENTION

The need is met according to the present invention by providing a method of processing a digital image that includes the steps of: specifying a noise control parameter; employing the noise control parameter to process the digital image to reduce the noise in the digital image; and employing the noise control parameter to process the digital image to adjust the tone scale of the digital image.

The present invention has the advantage that an optimal balance can be achieved between noise reduction and tone scale adjustments without the need for complex data processing.

DETAILED DESCRIPTION OF THE INVENTION

A digital image is comprised of a one or more digital image channels. Each digital image channel is comprised of a two-dimensional array of pixels. Each pixel value relates to the amount of light received by the imaging capture device corresponding to the geometrical domain of the pixel. For color imaging applications a digital image will typically consist of red, green, and blue digital image channels. Other configurations are also practiced, e.g. cyan, magenta, and yellow digital image channels. For monochrome applications, the digital image consists of one digital image channel. Motion imaging applications can be thought of as a time sequence of digital images. Those skilled in the art will recognize that the present invention can be applied to, but is not limited to, a digital image channel for any of the above mentioned applications. Although the present invention describes a digital image channel as a two dimensional array of pixels values arranged by rows and columns, those skilled in the art will recognize that the present invention can be applied to mosaic (non rectilinear) arrays with equal effect. Those skilled in the art will also recognize that although the present invention describes replacing original pixel values with noise cleaned pixel values, it is also trivial to form a new digital image with the noise cleaned pixel values and retain the original pixel values.

Figure 1:
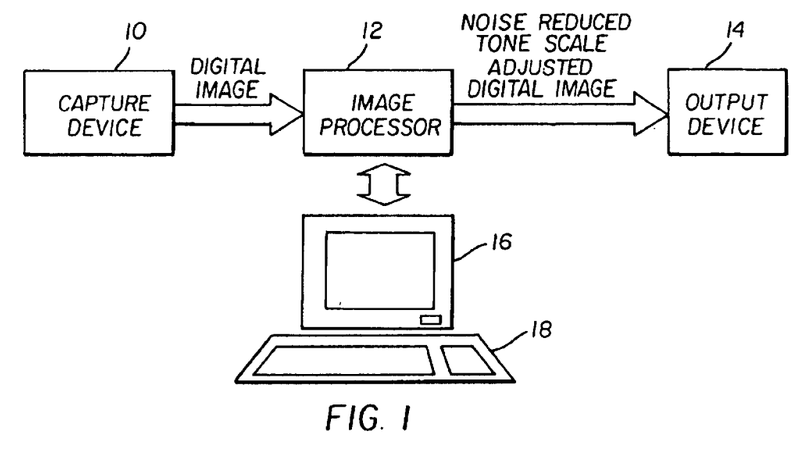
FIG. 1 is a block diagram showing an image processing system suitable for practicing the present invention.

The present invention can be implemented as a software program running in computer hardware such as a personal computer or special purpose digital image processing computer. Referring to FIG. 1, the following description relates to a digital imaging system that includes an image capture device 10, an image processor 12, and an image output device 14. The system may include a monitor 16 and an operator input device 18, such as a keyboard. For example, FIG. 1 may represent a digital photofinishing system where the image capture device 10 is a conventional photographic film camera for capturing a scene on color negative or reversal film and a film scanner device for scanning the developed image on the film and producing a digital image. The image processor 12 provides the means for processing the digital images to produce pleasing looking images on the intended output device or media, which could be photographic prints, softcopy display, etc. The image processor 12 processes the digital image to correct for noise introduced to the image by the capture media and/or capture device 10. It also adjusts the tone scale of the image in a manner such that a pleasing looking image is produced by the output device 14. The interaction between these processing steps is explained in more detail below.

Figure 2:
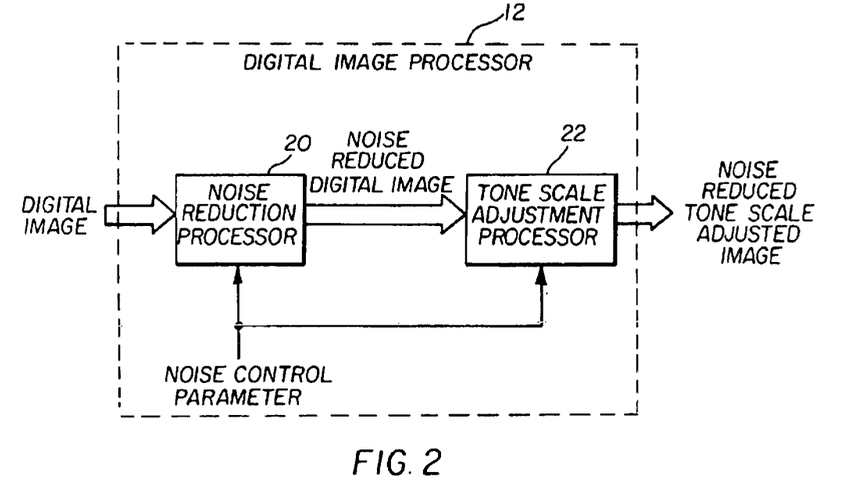
FIG. 2 is a block diagram showing the image processing method according to the present invention.

Referring to FIG. 2, the preferred embodiment of the present invention employs a noise reduction processor 20 followed by a tone scale adjustment processor 40. As such, a digital image is input to the noise reduction processor 20 which produces on output a noise reduced digital image. This noise reduced digital image is input to the tone scale adjustment processor 40 which produces a noise reduced tone scale adjusted digital image. For the purpose of this invention, a noise reduced tone scale adjusted digital image is defined as a digital image which has been processed by both a noise reduction processor and a tone scale adjustment processor where both the noise reduction processor and the tone scale adjustment processor have both been controlled by at least one noise control parameter.

Figure 3:
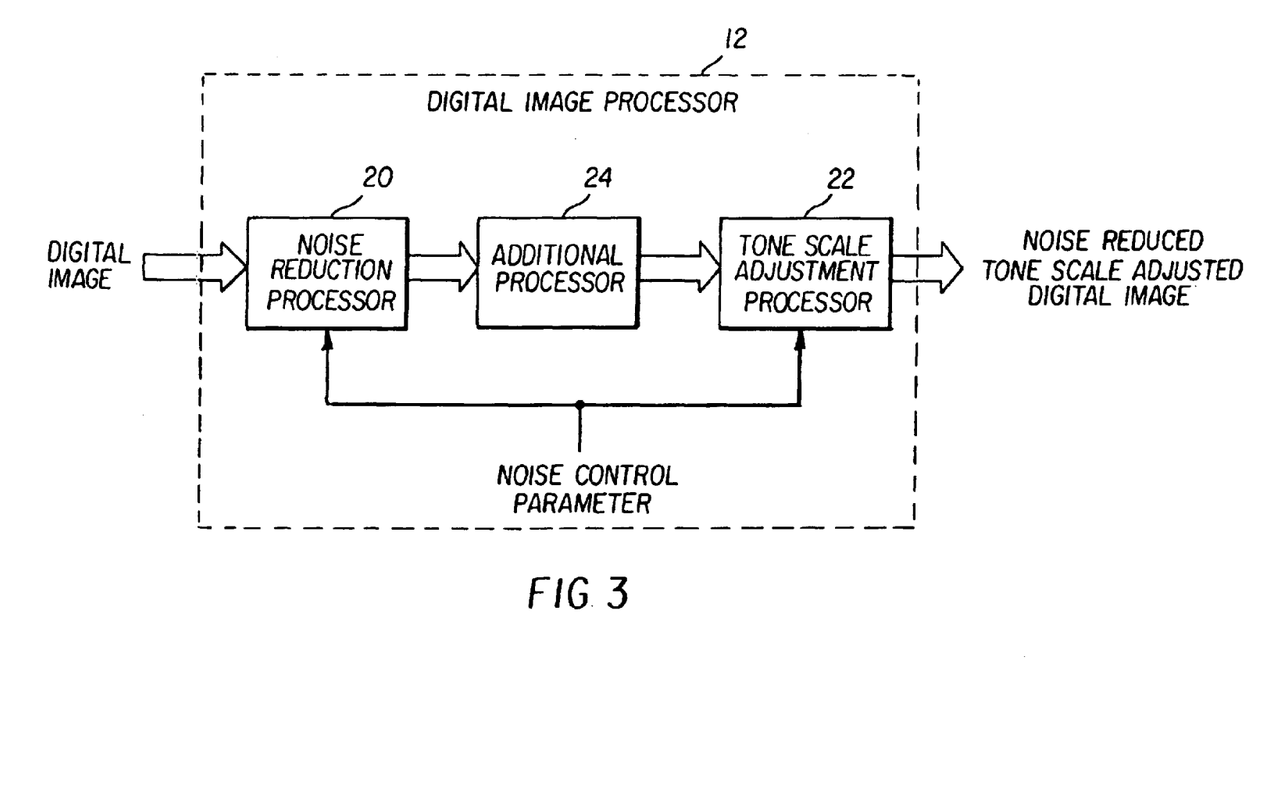
FIG. 3 is a block diagram showing the image processing method according to the present invention including additional processing.

It is important to note that for many practical digital imaging systems, other image processing processors need to be included. As long as these other image processing processors accept a digital image as input and produce a digital image on output, one more of these type of image processing processors can be inserted in the image processing chain in between a noise reduction processor 20 and a tone scale adjustment processor 40. Referring to FIG. 3, an additional processor 24 has been inserted after the noise reduction processor 20 and before the tone scale adjustment processor 22. A spatial filter designed to sharpen, or enhance the spatial detail of a digital image, is an example of an additional processor 24.

Figure 4:
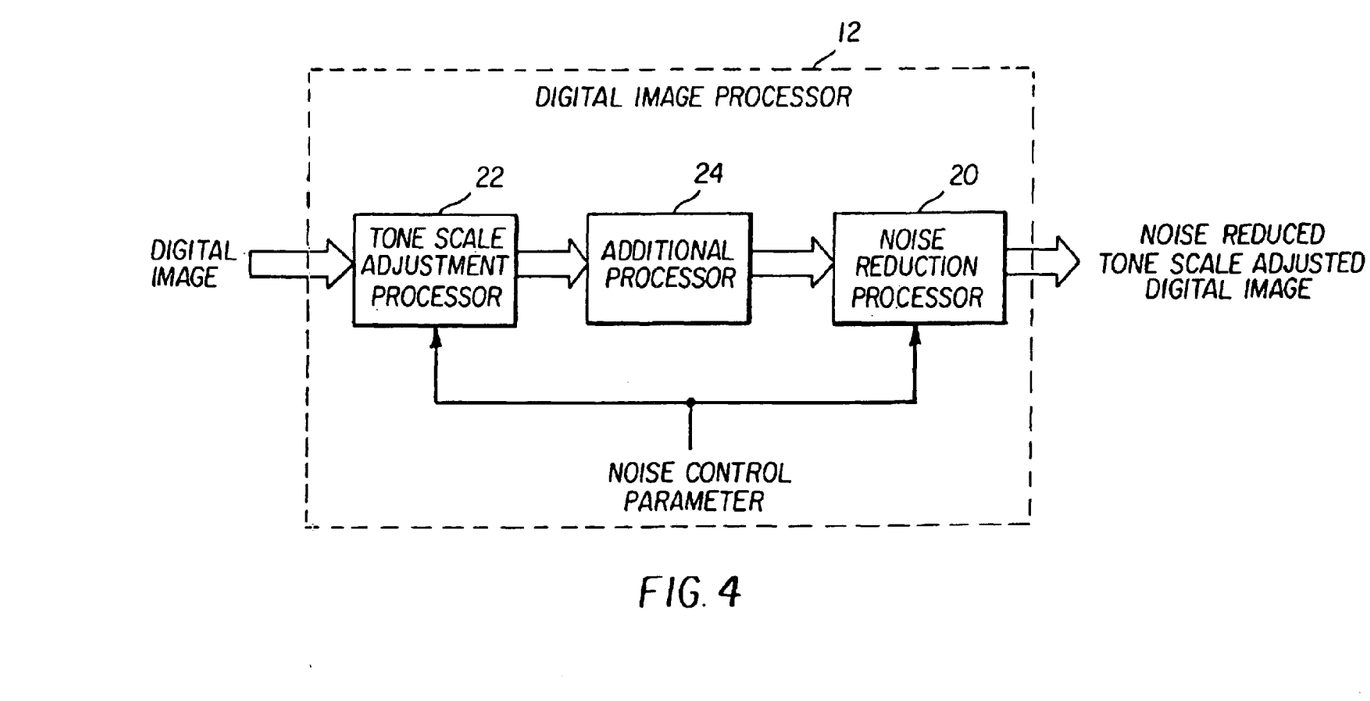
FIG. 4 is a block diagram showing the image processing method according to the present invention including additional processing.

An alternative embodiment of the present invention reverses the order of the operations of the noise reduction processor 20 and tone scale adjustment processor 40 shown in FIG. 4. A digital image is input to the tone scale adjustment processor 40 which produces a tone scale adjusted digital image on output. The noise reduction processor 20 accepts the tone scale adjusted digital image as a digital image input and produces a noise reduced tone scale adjusted digital image on output. An additional processor 24 has been inserted before the noise reduction processor 20 and after the tone scale adjustment processor 22.

Figure 5:
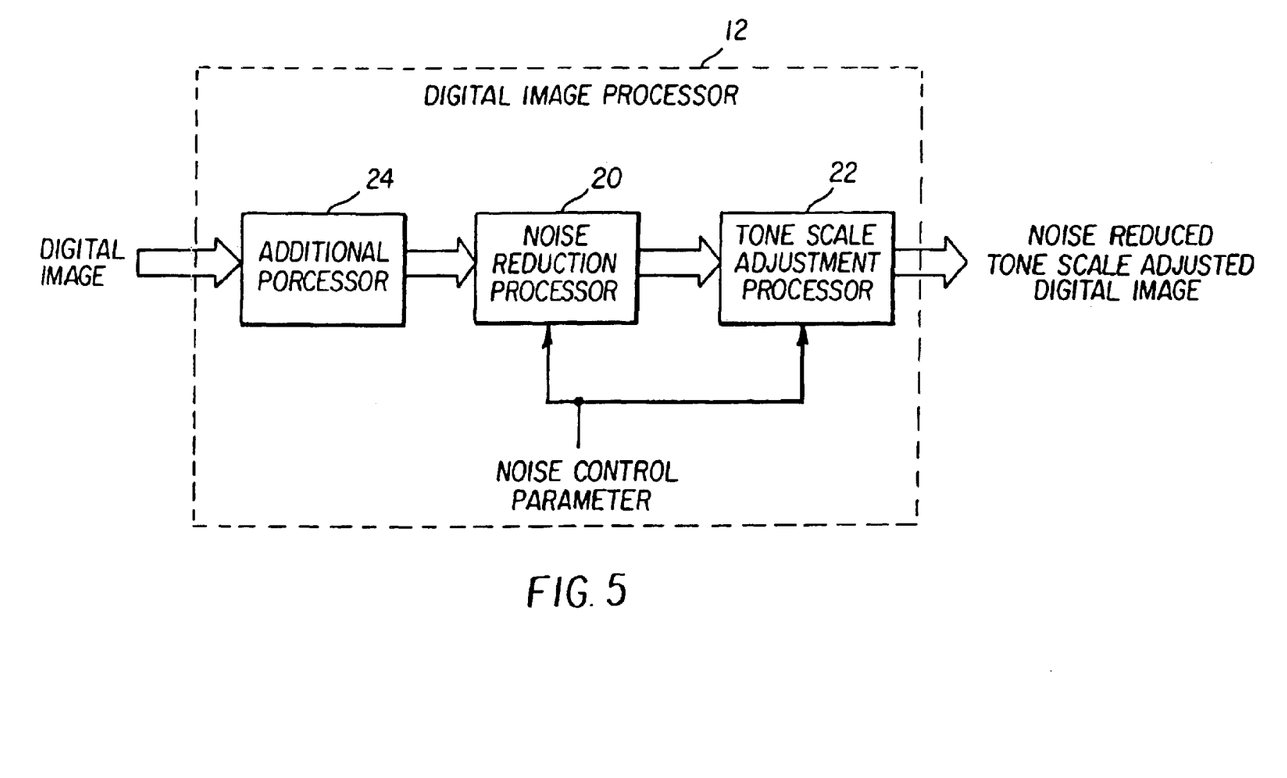
FIG. 5 is a block diagram showing the image processing method according to the present invention including additional processing.

In another alternative embodiment of the present invention, shown in FIG. 5, an additional processor 24 has been inserted before both the noise reduction processor 20 and tone scale adjustment processor 40. Since the additional processor 24 receives a digital image on input and produces a digital image on output, an additional processor can be placed before or after the operation of the noise reduction processor 20 and tone scale adjustment processor 22.

Referring back to FIG. 2, the image processor includes a noise reduction processor 20 and a tone scale adjustment processor 22. Both of these processors receive the same noise control parameter.

The Noise Control Parameter

The preferred embodiment of the present invention sets the noise control parameter based on the amount of noise present in the digital image input to the image processor 12. For 12-bit quantized digital images, the pixel values range from 0 to 4095. For sources of digital images which can be characterized by an average per pixel amount of noise, as measured by a standard deviation metric, of 15 or less are assigned a noise control parameter value of one. For sources of digital images which have an average per pixel amount of noise of greater than 15 and less than or equal to 40 are assigned a noise control parameter value of two. For sources of digital images which have an average per pixel amount of noise of greater than 40 are assigned a noise control parameter value of three. These assignments are based on the relative magnitudes of noise for the system. The absolute levels can be adjusted based on the numeric range of the source imagery and are empirically derived to assign digital image sources into low medium and high noise content.

The preferred embodiment of the present invention uses a pre-defined average per pixel amount of noise value for each image source to set the noise control parameter. A table of pre-defined average per pixel amount of noise values is obtained—one for each film type. For example if the digital image input to noise reduction processor 20 is film type A, the corresponding pre-defined average per pixel amount of noise value for film type A is retrieved. Based on the retrieved pre-defined average per pixel amount of noise value, a noise control parameter of one, two, or three is generated. Each film type that is supported by the system has a corresponding stored pre-defined average per pixel amount of noise value and thus a corresponding noise control parameter. In a practical system not all manufactured film types or other sources of digital images, such as digital cameras, may be supported. For digital images for which no pre-defined average per pixel amount of noise value exists a default value of one is selected for the noise control parameter.

Pre-defined average per pixel amounts of noise values can be generated for any source of digital image. Typically to generate the noise value amounts, a test target of multiple uniform reflectance patches is photographed. If the image source is a photographic film product, a digital image is produced by the capture device 10. An overall standard deviation value is calculated by applying either an automated or user-assisted software program which calculates the standard deviation of the pixel values in the test target image. The derived standard deviation value constitutes a pre-defined average per pixel amount of noise value.

Alternatively the noise can be estimated from any digital image as described in U.S. Pat. No. 5,633,511 to Lee et. al. Lee et al. describe a method of estimating the expected amount of noise present in a digital image by using the pixels values of the digital image. This method is computationally time consuming and is only an approximation. However, methods of approximating the amount of noise present in a digital image can be used in conjunction with the present invention to set the noise control parameter. This alternative embodiment of the present invention has the advantage that a table of pre-defined average per pixel amount of noise values does not have to be maintained.

Lee et. al's description of estimating the expected amount of noise present in a digital image is as follows. In order to distinguish the actual image activity from the noise fluctuations, it is necessary to estimate the image noise as a function of the pixel code value due to the fact that the noise is dependent on the signal. An edge gradient of every pixel is calculated to distinguish the uniform area from the busy area in the digital image. The value of the expected amount of noise is estimated from the standard deviation as sampled from the uniform areas of the digital image. The noise control parameter needed to coordinate the noise reduction processor 20 and tone scale adjustment processor 22 is calculated from the computed pre-defined average per pixel amount of noise value by the same method described in the preferred embodiment of the present invention.

Since the pre-defined average per pixel amount of noise value is calculated from the digital image pixel values, and the noise control parameter is derived from the pre-defined average per pixel amount of noise value, the noise control parameter is derived from the input digital image directly.

In another alternative embodiment of the present invention the ISO photographic speed value is used to determine the noise control parameter. For example, if the corresponding ISO photographic speed value is less than 100, the noise control parameter is set to a value of one. For corresponding ISO photographic speed values greater than or equal to 100 and less than 800, the noise control parameter is set to a value of two. For digital images with corresponding ISO photographic speed values greater than 800, the noise control parameter is set to a value of three. Referring to FIG. 1, the ISO photographic speed value can be obtained from the capture device 10 or from the operator via the keyboard 18. The ISO photographic speed value is not information contained in the digital image directly. As such it is an example of image meta-data (additional information corresponding to the digital image). This alternative embodiment of the present invention, therefore, is an example of setting the noise control parameter based on image meta-data.

According to an alternative embodiment of the present invention the noise control parameter is set by an operator via keyboard 18 based on a visual observation of the digital image displayed on monitor 16. Since the noise control parameter can be numerically related to the image source expected noise level, the keyboard operator can visually assess the amount of noise in the displayed image and select an appropriate noise control parameter setting.

The Noise Reduction Processor

Figure 6:
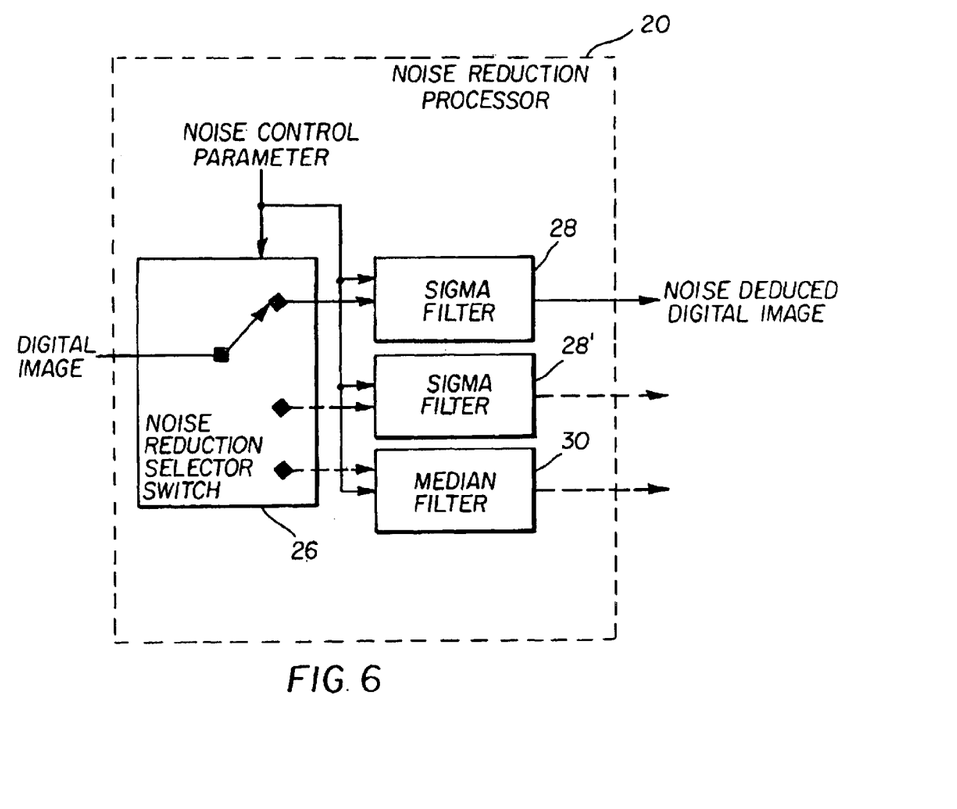
FIG. 6 is a block diagram illustrating the noise reduction process of the present invention.

The noise control parameter is used by the noise reduction processor to vary the degree of noise reduction (including not applying any noise reduction). This can be accomplished by selecting between a number of different noise reduction filters or by using a single noise reduction filter employed in different configurations. For example, a median filter may be applied for digital images containing high levels of noise, such as images captured on high speed photographic film. For digital images containing low levels of noise, such as captured on low speed photographic film, a Sigma filter may be preferred. The preferred embodiment of the present invention switches between two different noise reduction filters based on the value of the noise control parameter. As shown in FIG. 6, the noise reduction processor may contain for example a pair of Sigma filters 28 and 28' having different configurations such that filter 28' provides more noise reduction than filter 28, a median filter 30 and a switch 26 that is controlled by the noise control parameter. If the noise control parameter is equal to one the Sigma filter 28 is used to process the digital image. If the noise control parameter is equal to two, the Sigma filter 28' is used. If the noise control parameter is equal to three, the median filter is used to process the digital image.

An alternative embodiment of the present invention uses a single noise reduction filter, such as a Sigma filter, with different tuning filter parameter settings constituting different configurations to vary the amount of noise reduction. This can include a selection of not using a noise reduction filter at all. The noise control parameter is used to select one of the configurations of the noise reduction filters.

The Sigma filter, described by Jong-Sen Lee in the journal article *Digital Image Smoothing and the Sigma Filter*, Computer Vision, Graphics, and Image Processing Vol 24, p. 255–269, 1983, as a noise reduction filter to enhance the visual appearance of the processed digital image. The values of the pixels contained in a sampled local region, n by n pixels where n denotes the length of pixels in either the row or column direction, are compared with the value of the center pixel, or pixel of interest. Each pixel in the sampled local region is given a weighting factor of one or zero based on the absolute difference between the value of the pixel of interest and the local region pixel value. If the absolute value of the pixel value difference is less or equal to a threshold $\epsilon$, the weighting factor if set to one. Otherwise, the weighting factor is set to zero. The numerical constant $\epsilon$ is set to two times the expected noise standard deviation. Mathematically the expression for the calculation of the noise reduced pixel value is given as $$q_{mn} = \Sigma_{ij}\, a_{ij}\, p_{ij} / \Sigma_{ij}\, a_{ij}$$

and $$a_{ij} = 1 \text{ if } |p_{ij} - p_{mn}| <= \epsilon$$

$$a_{ij} = 0 \text{ if } |p_{ij} - p_{mn}| > \epsilon$$

where $p_{ij}$ represents the $ij^{th}$ pixel contained in the sampled local region, $P_{mn}$ represents the value of the pixel of interest located at row m and column n, $a_{ij}$ represents a weighting factor, and $q_{mn}$ represents the noise reduced pixel value. Typically, a rectangular sampling region centered about the center pixel is used with the indices i and j varied to sample the local pixel values.

The signal dependent noise feature is incorporated into the expression for $\epsilon$ given by $$\epsilon = Sfac\ \sigma_n(p_{mn})$$

where $\sigma_n$ represents the noise standard deviation of the source image evaluated at the center pixel value $p_{mn}$. The parameter Sfac is a scale factor that is used to vary the degree of noise reduction according to the present invention. The calculation of the noise reduced pixel value $q_{mn}$ as the division of the two sums is then calculated. The process is completed for some or all of the pixels contained in the digital image channel and for some or all the digital image channels contained in the digital image. The noise reduced pixel values constitute the noise reduced digital image.

Figure 7:
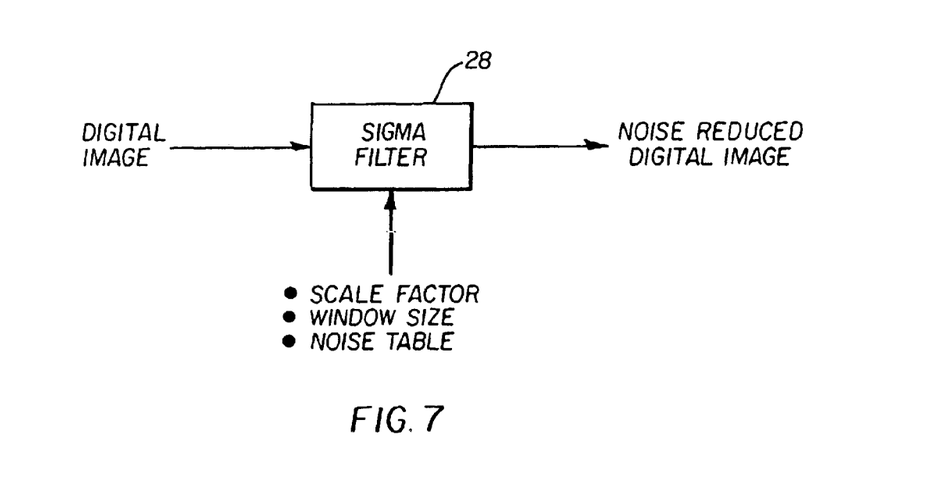
FIG. 7 is a block diagram illustrating the input and outputs of a Sigma filter employed by the preferred embodiment of the present invention.

Referring to FIG. 7, a Sigma filter 28 is illustrated which receives a digital image as input. The input parameters scale factor Sfac, window size parameter, and noise table as input and used to set up the Sigma filter 28 in different configurations. For example, employing the Sigma filter with a scale factor of 2.0 versus 3.0 constitutes two different configurations. The Sigma filter 28 processes the digital image pixel data and produces a noise reduced digital image on output.

A median filter can be used as a noise reduction filter to reduce the noise present in a digital image. The noise reduced pixel value produced with a median filter is typically derived by calculating the statistical mean of values taken from a sampling region centered about the pixel of interest. Typically an n by n square window size is chosen where n denotes the length of pixels in either the row or column direction. The degree of noise reduction is controlled by the size of the window. Larger window sizes result in more noise removed from the digital image.

Tone Scale Adjustment Processor

Figure 8:
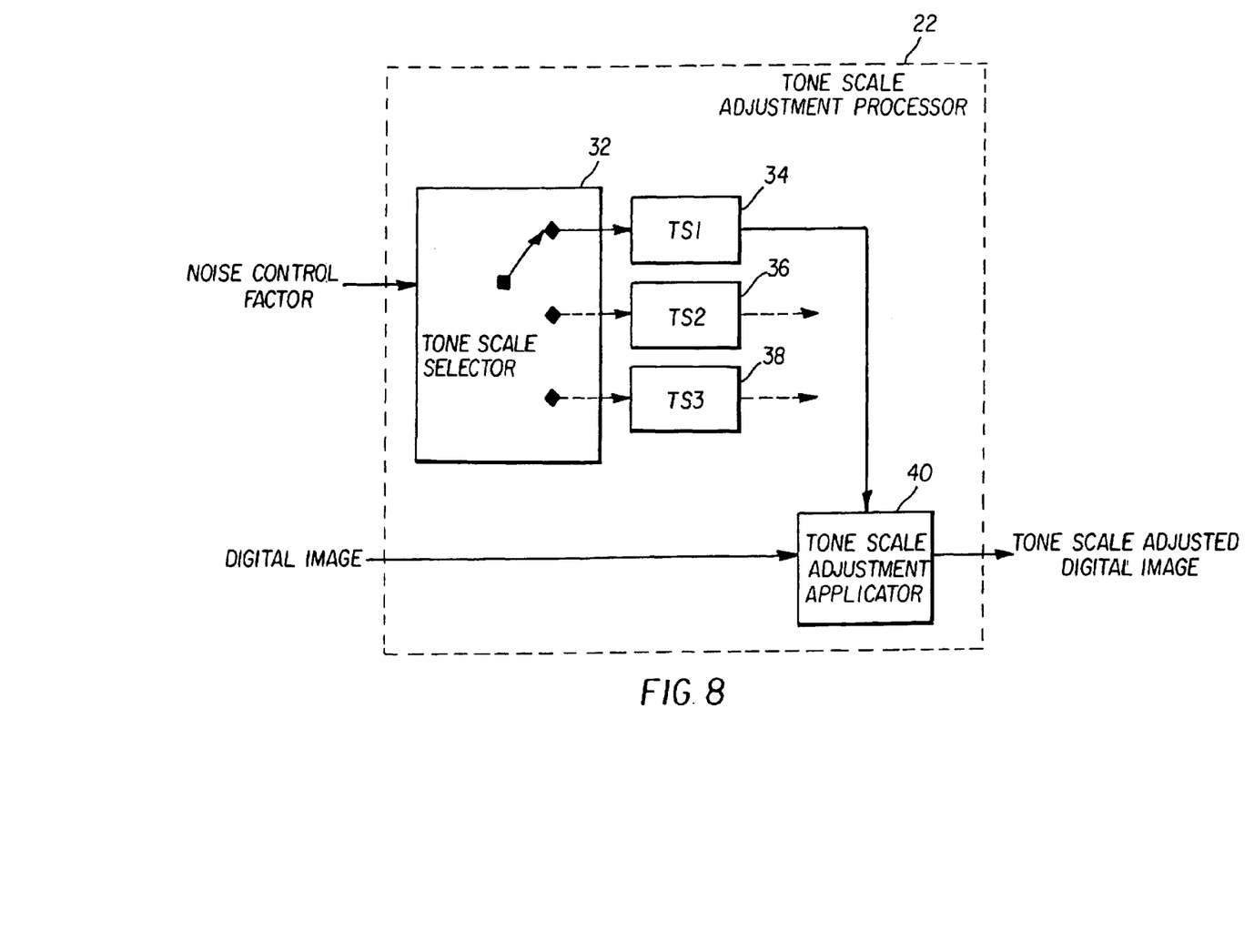
FIG. 8 is a block diagram illustrating the tone scale adjustment process of the present invention.

Referring to FIG. 8, the tone scale adjustment processor 22 includes a plurality of look-up tables (LUT's) 34, 36 and 38. The tone scale selector 32, selects one of these LUTs as input to the tone scale adjustment applicator 40. The tone scale adjustment applicator 40 accepts a digital image and applies the LUT to the digital image which results in a tone scale adjusted digital image. Since a noise reduced digital image is also a digital image, if a noise reduced digital image is received by the tone scale adjustment processor 22, a noise reduced tone scale adjusted digital image is produced on output.

The LUT's contained in the tone scale adjustment processor 22 are designed to impart different tone scale qualities to the output digital image. For example, the three tone scale LUT's chosen for the preferred embodiment of the present invention are designed to vary the contrast of the input digital image. The ideal or prudent level of contrast enhancement depends on the amount of noise contained in the input digital image. Thus the present invention coordinates the amount of noise reduction performed and the amount of tone scale adjustment performed through the noise control parameter.

The preferred embodiment of the present invention uses LUT's for adjusting the tone scale of a digital image. The LUT consists of a table of output values; one for each input pixel value. The processed pixel values are obtained by replacing the input pixel value by the output value corresponding to the input pixel value. Computationally, LUT's are the most efficient method of adjusting the tone scale of a digital image. However, if the tone scale adjustments can be expressed by a mathematical equation, tone scale adjustments can be made by computing the corresponding mathematical equations in software logic.

The preferred embodiment of the present invention uses a method for generating LUT's that adjust the tone scale of digital images derived from the method taught in U.S. Pat. No. 5,134,573 issued Jul. 28, 1992 to Goodwin. In particular, this patent describes a method for adjusting the tone scale of a digital image that compensates for the non-linear sensitometric response of photographic film. This method can be applied to adjust the tone scale of any non-linear image capture device. The mathematics of this method are used to construct a LUT. As part of the description of the construction method, Goodwin states that optimum mathematical parameters vary depending on the expected amount of noise contained in the input digital image. Applying one of these LUT's generated with the method described by Goodwin results in a digital image with increased contrast in image regions which originally received little light.

Figure 9:
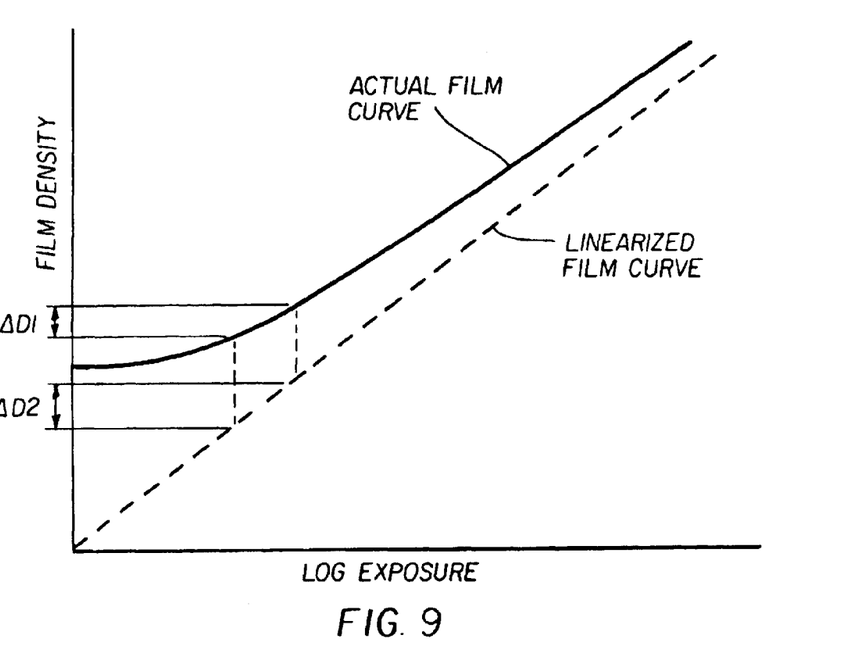
FIG. 9 is a plot showing a preferred tone scale adjustment.

The method taught by Goodwin states that the linear sensitometric response range of digital images captured on color negative photographic film could be increased by applying a LUT constructed using a mathematical formula intended to invert the natural sensitometric response of the photographic film. In particular, the contrast in the toe (corresponding to image regions receiving little light) and shoulder (corresponding to image regions receiving excessive amounts of light) of a film's standard density to log exposure (D-LogE) curve. Referring to FIG. 9, in Goodwin's method, a parameter γ describes the adjustment in contrast which theoretically would result in the toe or shoulder portion of a photographic film sensitometric curve, and is given by:

$$\gamma = \frac{\Delta D2}{\Delta D1}$$

where ΔD1 represents the density difference which would result in the actual film from two nearly equal exposures, and ΔD2 represents the corresponding density difference which would result in the linearized film from the same two exposures. The parameter γ represents the contrast adjustment to be applied to the digital image at every density level. However, at the shoulder and toe of the D-LogE curve, as the slope approaches zero, ΔD1 approaches 0 and the contrast adjustment will increase without limit, approaching infinity. This will amplify the noise characteristics in the processed digital image resulting in visually objectionable noise. Consequently, the contrast adjustment needs to be controlled in a manner which is sensitive to the expected noise present in the digital image. An allowed maximum contrast adjustment is specified by the parameter $\gamma_{max}$. Contrast adjustments below γmax are gradually reduced back to 1. In that case the parameter γ is substituted by γ' given by the following formulation:

$$\gamma' = \begin{cases} \gamma & \text{if } \gamma < \gamma_{max} \\ 1 + \dfrac{A}{B + e^{(C\gamma - D)}} & \text{if } \gamma \geq \gamma_{max} \end{cases}$$

where A, B, C, and D are constants which depend upon the maximum contrast adjustment. The amount of expected noise contained in the input digital image will affect the selection of optimal parameters A, B, C, D and $\gamma_{max}$. Goodwin's method can be modified according to the present invention by providing a less complex mathematical formula for contrast adjustments below $\gamma_{max}$. For the case of γ less than $\gamma_{max}$, the parameter γ is substituted by γ' given by a simple functional relationship:

$$\gamma' = \begin{cases} \gamma & \text{if } \gamma < \gamma_{max} \\ 1 + \dfrac{\gamma_{max} - 1}{1 + K \cdot (\gamma - \gamma_{max})^2} & \text{if } \gamma \geq \gamma_{max} \end{cases}$$

where the parameter K establishes the convergence speed of the function to a minimum value of 1.0. In the preferred embodiment of the present invention K is set equal to 0.5.

The parameters K and $\gamma_{max}$ for the tone scale LUT can be derived directly from the automatic estimation of the noise in the image pixel data as taught by Lee et al. in U.S. Pat. No. 5,633,511. This is an example of adjusting the tone scale of a digital image based on the pixel values of the digital image.

The preferred embodiment of the present invention coordinates the selection of a noise reduction filter method and the optimal parameter values for a tone scale adjustment method. Table 1 shows noise control parameter values and the corresponding parameters which control the amount of noise reduction performed and the amount of tone scale adjustment performed. In particular, for a noise control parameter value of one, the Sigma filter noise reduction filter is used with an 11 by 11 window size and the Sfac parameter is set to 1.25 and the $\gamma_{max}$ tone scale parameter is set to 4. For a noise control parameter value of two, the Sigma filter noise reduction filter is used with an 11 by 11 window size and the Sigma filter Sfac parameter is set to 1.5 and the $\gamma_{max}$ tone scale parameter is set to 6. For a noise control parameter value of three, the median filter is used with a window size of 3 by 3 pixels and the $\gamma_{max}$ tone scale parameter is set to 8.

TABLE 1

An example of tone scale adjustment parameter control.

| Noise control parameter | Noise Reduction Processor | Tone Scale Adjustment Processor |
| --- | --- | --- |
| 1 | Sfac = 1.25 | γmax = 4 |
| 2 | Sfac = 1.5 | γmax = 6 |
| 3 | 3x3 median filter | γmax = 8 |

Figure 10:
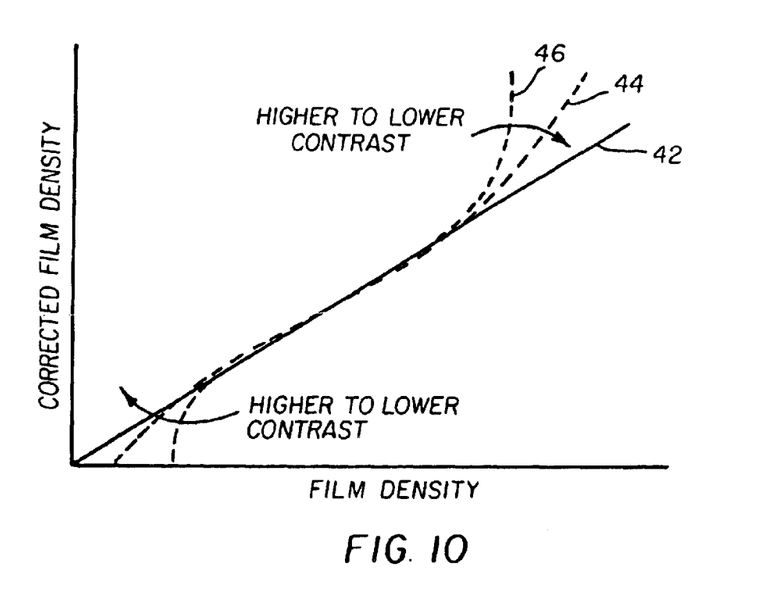
FIG. 10 is a plot showing a family of tone scale adjustments.

FIG. 10 presents an example of a family of tone scale adjustment curves 42, 44 and 46 representing the LUTs 34, 36 and 38 contained in the tone scale adjustment processor shown in FIG. 8. They range from 0% correction (represented by the straight line or $\gamma_{max}$ equal to 1) to 100% correction (unbounded inversion of the film sensitometry).

Figure 11:
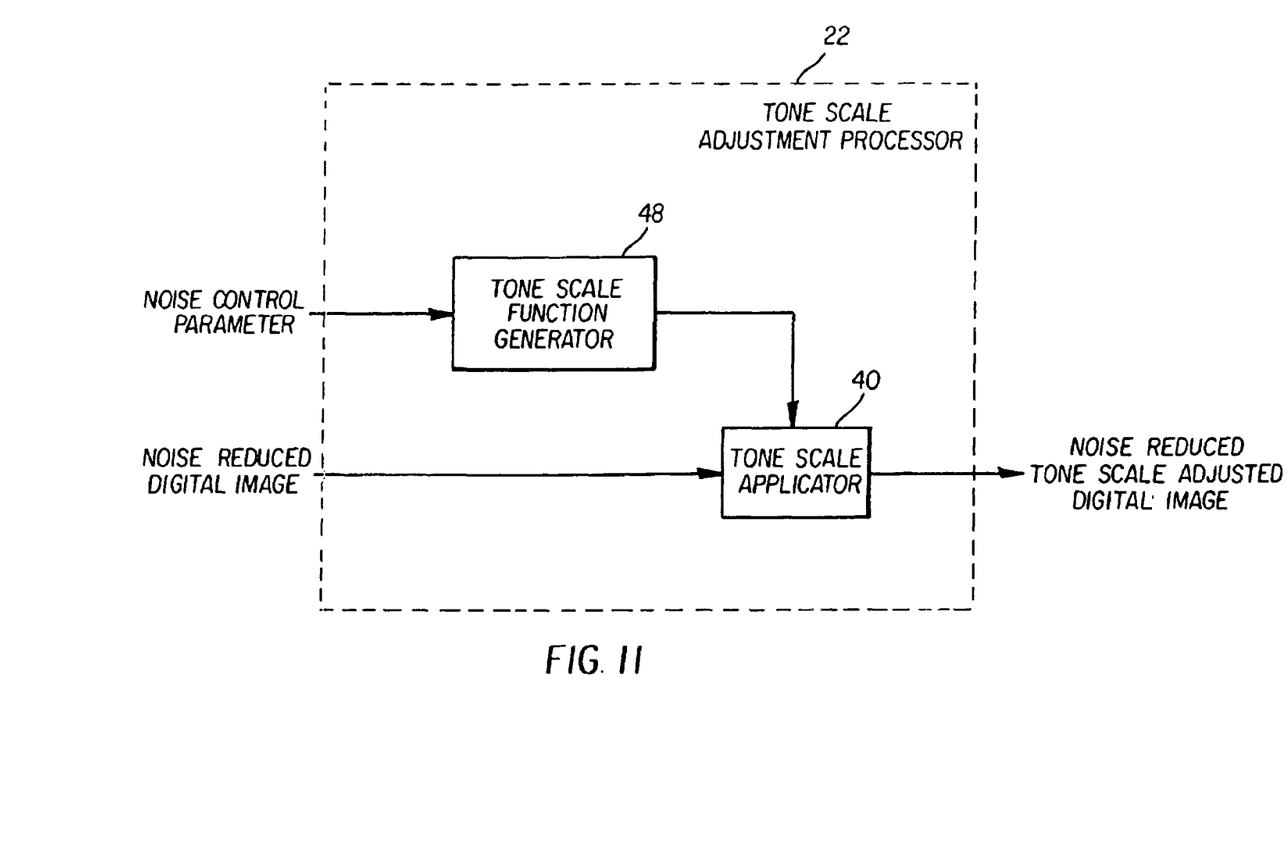
FIG. 11 is a block diagram illustrating an alternative embodiment of the tone scale adjustment process of the present invention.

FIG. 11, illustrates an alternative embodiment of the present invention where the tone scale adjustment LUT is constructed by a continuous tone scale adjustment function generator 48. In this case, instead of providing discrete pre-defined instances of tone scale adjustment LUT's, the LUT is generated for each processed digital image based on the noise control parameter. The tone scale adjustment function generator 48 uses the same method of calculating a tone scale adjustment LUT as the preferred embodiment of the present invention with the exception that the LUT applied to the digital image input is not pre-defined.

The present invention is preferably practiced in an image processing system including a source of digital images, such as a scanner, a computer programmed to process digital images, and an output device such as a thermal or inkjet printer. The method of the present invention may be sold as a computer program product including a computer readable storage medium bearing computer code for implementing the steps of the invention. Computer readable storage medium may include, for example; magnetic storage media such as a magnetic disc (e.g. a floppy disc) or magnetic tape; optical storage media such as optical disc or optical tape; bar code; solid state electronic storage devices such as random access memory (RAM)or read only memory (ROM); or any other physical device or medium employed to store a computer program.

The invention has been described in detail with particular reference to certain preferred embodiments thereof, but it will be understood that variations and modifications can be effected within the spirit and scope of the invention.

PARTS LIST 10 image capture device
12 digital image processor
14 output device
16 monitor
18 keyboard
20 noise reduction processor
22 tone scale adjustment processor
26 noise reduction selector
28 Sigma filter
30 median filter
32 tone scale selector
34 tone scale LUT
36 tone scale LUT
38 tone scale LUT
40 tone scale applicator
48 tone scale adjustment function generator

What is claimed is:

1. A method of processing a digital image, comprising the steps of:
    a) selecting a noise control parameter value, said value defining a spatial filter and a tone scale adjustment;
    b) processing the digital image with said spatial filter to reduce the noise in the digital image; and
    c) processing the digital image with said tone scale adjustment to adjust the tone scale of the digital image.
2. The method claimed in claim 1, wherein the noise control parameter value is selected by an operator.
3. The method claimed in claim 1, wherein said selecting further comprises deriving the noise control parameter value from meta-data accompanying the digital image.
4. The method claimed in claim 3, wherein the meta-data is film speed.
5. The method claimed in claim 1, wherein said selecting further comprises deriving the noise control parameter value from the digital image pixel values.
6. The method claimed in claim 1, wherein said spatial filter is a median filter.
7. The method claimed in claim 1, wherein said spatial filter is a Sigma noise filter.
8. The method claimed in claim 1, wherein the selected noise control parameter value is one of a plurality of values, which each define a respective one of a plurality of different spatial filters and a respective one of a plurality of different tone scale LUT's.
9. The method claimed in claim 1, wherein the tone scale adjustment is responsive to the noise control parameter value to generate a tone scale adjustment function and apply it to the digital image.
10. The method claimed in claim 1, wherein the tone scale adjustment compensates for a non-linear sensitometric response of an image capture device.
11. The method claimed in claim 1, wherein said processing the digital image with said tone scale adjustment further comprises applying a LUT that is derived from image pixel data.
12. The method claimed in claim 11, wherein the LUT is derived from an automatic estimation of noise in the image data.
13. A computer storage medium having instructions stored therein for causing a computer to perform the method of claim 1.
14. The computer storage medium claimed in claim 13 further including the feature of claim 2.
15. The computer storage medium claimed in claim 13 further including the feature of claim 3.
16. The computer storage medium claimed in claim 15 further including the feature of claim 4.
17. The computer storage medium claimed in claim 13 further including the feature of claim 5.
18. The computer storage medium claimed in claim 13 further including the feature of claim 6.
19. The computer storage medium claimed in claim 18 further including the feature of claim 7.
20. The computer storage medium claimed in claim 13 further including the feature of claim 8.
21. The computer storage medium claimed in claim 13 further including the feature of claim 9.
22. The computer storage medium claimed in claim 13 further including the feature of claim 10.
23. The computer storage medium claimed in claim 13 further including the feature of claim 11.
24. A system for processing a digital image, comprising:
    a noise control parameter unit specifying a selected value of a noise control parameter, said value defining a spatial filter and a tone scale adjustment;
    a noise reduction processor processing the digital image with said spatial filter, responsive to said noise control parameter value, to reduce noise in the digital image; and
    a tone scale adjustment processor processing the digital image with said tone scale adjustment, responsive to said noise control parameter value, to adjust the tone scale of the digital image.
25. The system claimed in claim 24, wherein the noise control parameter value is operator selected.
26. The system claimed in claim 24, wherein said noise control parameter unit further comprises means for deriving the noise control parameter from meta-data accompanying the digital image.

27. The system claimed in claim 26, wherein the metadata is film speed.

28. The system claimed in claim 24, wherein the noise control parameter is derived from the digital image pixel values.

29. The system claimed in claim 24, wherein said spatial filter is a median filter.

30. The system claimed in claim 24, wherein said spatial filter is a Sigma noise filter.

31. The system claimed in claim 24, wherein the tone scale adjustment processor includes a plurality of tone scale LUT's and said tone scale adjustment processor, responsive to the noise control parameter value, selects one of the LUT's as said tone scale adjustment and applies the selected LUT to the digital image.

32. The system claimed in claim 24, wherein the tone scale adjustment is a function and the tone scale adjustment processor contains a tone scale adjustment function generator that is responsive to the noise control parameter value to generate the tone scale adjustment and apply the tone scale adjustment to the digital image.

* * * * *